US010637293B2

(12) United States Patent
Costinett et al.

(10) Patent No.: US 10,637,293 B2
(45) Date of Patent: Apr. 28, 2020

(54) DUAL-FREQUENCY MODE TRANSMITTER FOR WIRELESS POWER TRANSFER

(71) Applicant: University of Tennessee Research Foundation, Knoxville, TN (US)

(72) Inventors: Daniel Jes Costinett, Knoxville, TN (US); Chongwen Zhao, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 306 days.

(21) Appl. No.: 15/718,767

(22) Filed: Sep. 28, 2017

(65) Prior Publication Data

US 2018/0097405 A1 Apr. 5, 2018

Related U.S. Application Data

(60) Provisional application No. 62/402,212, filed on Sep. 30, 2016.

(51) Int. Cl.

| | |
|---|---|
| ***H02J 50/12*** | (2016.01) |
| ***H02M 7/5387*** | (2007.01) |
| ***H02J 50/40*** | (2016.01) |
| ***H02M 7/48*** | (2007.01) |
| *H02M 3/335* | (2006.01) |
| *H02J 7/02* | (2016.01) |

(52) U.S. Cl.

CPC .............. *H02J 50/12* (2016.02); *H02J 50/40* (2016.02); *H02M 7/53871* (2013.01); *H02J 7/025* (2013.01); *H02M 3/33561* (2013.01); *H02M 2007/4815* (2013.01); *Y02B 70/1441* (2013.01)

(58) Field of Classification Search

None

See application file for complete search history.

(56) References Cited

U.S. PATENT DOCUMENTS

| | | | | |
|---|---|---|---|---|
| 2010/0114090 A1* | 5/2010 | Hosier | A61B 18/12 606/33 |
| 2013/0305760 A1* | 11/2013 | Shinomoto | F25B 49/025 62/238.7 |
| 2016/0261142 A1* | 9/2016 | Park | H02J 50/40 |
| 2017/0018937 A1* | 1/2017 | Muratov | H02J 50/12 |
| 2018/0198322 A1* | 7/2018 | Mercier | H01F 38/14 |

OTHER PUBLICATIONS

"Multifrequency Inductive Power Transfer," Pantic et al., IEEE Trans. Power Electron., vol. 29, No. 11, pp. 5995-6005, Nov. 2014 (Year: 2014).*

* cited by examiner

*Primary Examiner* — Jared Fureman
*Assistant Examiner* — Joel Barnett
(74) *Attorney, Agent, or Firm* — Myers Bigel, P.A.

(57) ABSTRACT

A transmitter for wireless power transfer is provided. The transmitter includes an input port, a first transmission port, a second transmission port, an inverter, and a controller. An input of the inverter is coupled to the input port, and an output of the inverter is coupled in parallel to the first and second transmission ports. The controller is programmed to control the inverter to modulate an output voltage at the output of the inverter such that power from the input port is transmitted at a first frequency through the first transmission port and at a second frequency through the second transmission port.

19 Claims, 11 Drawing Sheets

DUAL-FREQUENCY MODE TRANSMITTER FOR WIRELESS POWER TRANSFER

CROSS-REFERENCE TO RELATED APPLICATION

This application claims priority to U.S. Provisional Application No. 62/402,212, filed Sep. 30, 2016, the disclosure of which is hereby incorporated by reference in its entirety.

STATEMENT REGARDING FEDERALLY SPONSORED RESEARCH OR DEVELOPMENT

This invention was made with government support under EEC-1041877 awarded by the U.S. National Science Foundation and the U.S. Department of Energy. The U.S. Government has certain rights in this invention.

BACKGROUND

The present disclosure generally relates to power converters for wireless power transfer (WPT). More specifically, the present disclosure relates to power converters that may transmit power wirelessly and concurrently in two different frequency bands.

Recent developments in WPT technologies have incited an era of cordless charging in applications from consumer electronics to electrical vehicles. The advantages of the wireless charging for consumer electronics include a more convenient experience than plug-in charging, avoiding charging wires, and seamless charging to extend battery life. The latter is particularly important when considering the rapid advancement of high performance processors and displays, and the resulting increase in power demand.

One problem in the wireless charging realm is the lack of a universal standard. On one hand, the Wireless Power Consortium's Qi standard specifies a transmission frequency in the 87 kHz to 205 kHz range. On the other hand, the AirFuel Alliance, a merger between Alliance for Wireless Power (A4WP) and Power Matters Alliance (PMA) standards, employs the Industrial, Scientific, and Medical (ISM) frequency band within 6.78 MHz±15 kHz, and a low frequency band of 100 kHz to 300 kHz. Such standard segmentation results in inconvenience for consumers and manufacturers. Devices with wireless charging capability designed to different standards are not interoperable, potentially requiring users with multiple mobile electronic devices to purchase and maintain one charger per device.

Therefore, the inventors recognized a need in the art for a WPT transmitter that operates in multiple frequency bands, across multiple WPT standards.

DETAILED DESCRIPTION

Embodiments of the present disclosure provide a transmitter for wireless power transfer (WPT) and methods for controlling the same. The transmitter includes an input port, a first transmission port, a second transmission port, an inverter, and a controller. An input of the inverter is coupled to the input port, and an output of the inverter is coupled in parallel to the first and second transmission ports. The controller is programmed to control the inverter to modulate an output voltage at the output of the inverter such that power from the input port is transmitted at a first frequency through the first transmission port and at a second frequency through the second transmission port.

Figure 1:
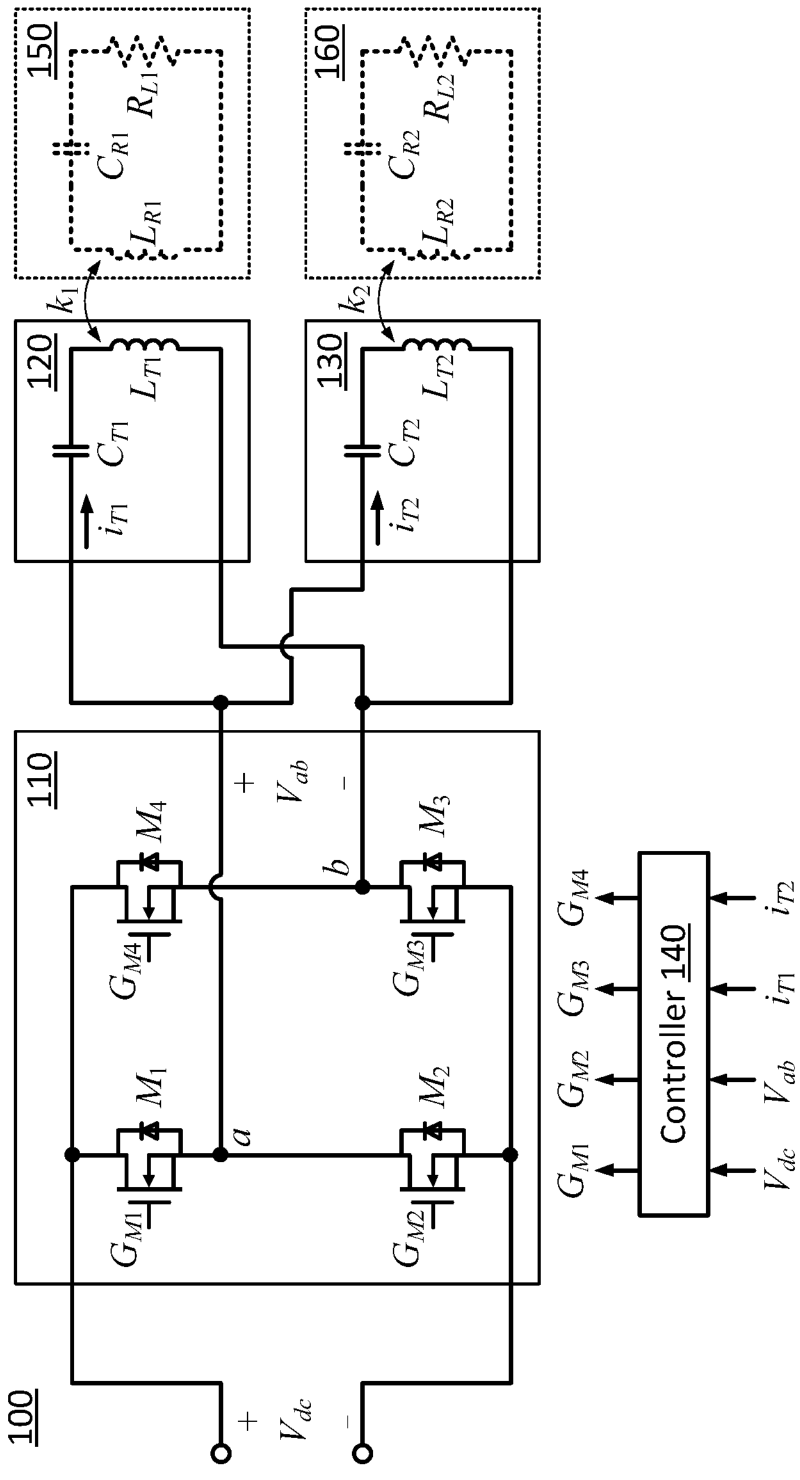
FIG. 1 is a schematic of a transmitter for a wireless power transfer (WPT) system, according to an embodiment of the present disclosure.

FIG. 1 illustrates a transmitter 100 for a WPT system, according to an embodiment of the present disclosure. The transmitter 100 may include an inverter 110 with a direct-current (DC) voltage $V_{dc}$ applied at its input. The output of the inverter 110 may be coupled in parallel to a first transmission port 120 of a first power transmission channel and a second transmission port 130 of a second power transmission channel. The transmitter 100 may transmit power, wirelessly and externally, to either or both of a first device 150 and a second device 160 via the first power transmission channel and the second power transmission channel, respectively. The transmitter 100 may further include a controller 140, which may provide a plurality of control signals to the inverter 110 based on one or more voltages and/or currents sensed within the transmitter 100.

The inverter 110 may be formed by a first leg in parallel with a second leg. The first leg may include a first transistor $M_1$ in series with a second transistor $M_2$, and the second leg may include a third transistor $M_3$ in series with a fourth transistor $M_4$. Examples of the transistors $M_1$-$M_4$ may include metal-oxide-semiconductor field-effect transistors (MOSFETs) and wide bandgap field-effect transistors such as gallium nitride field-effect transistors (GaNFETs). In certain embodiments, the voltage $V_{dc}$ may be provided across the first and second legs by a rectifier coupled to an alternating-current (AC) input source (e.g., a household 120-V 60-Hz power outlet). The rectifier may be either part of or external to the transmitter 100. In other embodiments, the voltage $V_{dc}$ may be provided by a DC source, such as a battery, which may be followed by a DC-DC converter. During operation, the inverter 110 may generate a voltage $V_{ab}$ at its output (across nodes a and b) and provide it to the first and second transmission ports 120, 130, causing currents $i_{T1}$ and $i_{T2}$ to flow in the first and second transmission ports 120, 130, respectively.

In FIG. 1, capacitors $C_{T1}$ and $C_{R1}$ and inductors $L_{T1}$ and $L_{R1}$ may represent compensation capacitors and inductive coils of the first power transmission channel. The subscripts T and R denote transmitting and receiving, respectively. Similarly, capacitors $C_{T2}$ and $C_{R2}$ and inductors $L_{T2}$ and $L_{R2}$ may represent compensation capacitors and inductive coils of the second power transmission channel. Mutual inductance between the inductors $L_{T1}$ and $L_{R1}$ is represented by a coefficient of coupling $k_1$, and mutual inductance between the inductors $L_{T2}$ and $L_{R2}$ is represented by a coefficient of coupling $k_2$. Resistors $R_{L1}$ and $R_{L2}$ may represent load resistances imposed on the first and second power transmission channels by the first and second devices 150, 160, respectively.

The controller 140 may generate gate signals $G_{M1}$-$G_{M4}$ for the transistors $M_1$-$M_4$ of the inverter 110, respectively, based on one or more of the voltages $V_{dc}$ and $V_{ab}$ and the currents $i_{T1}$ and $i_{T2}$, which may be sensed by a variety of sensors that are known in the art and that are not shown in FIG. 1. The controller 140 may include a processor (e.g., a digital signal processor (DSP)) and a memory to allow for non-volatile or volatile storage of instructions to be executed by the microprocessor and/or storage of lookup tables to be invoked by the processor.

According to an embodiment of the present disclosure, the controller 140 may generate the gate signals $G_{M1}$-$G_{M4}$ based on a multi-frequency programmed pulse width modulation (MFPWM) scheme, in order to modulate the output voltage $V_{ab}$ of the inverter 110 to have two distinct frequencies in its spectrum. Each of these two distinct frequencies may be chosen to match each of two predetermined frequencies at which power may be transferred via the first and second power transmission channels. The MFPWM scheme is based on a principle of calculating a plurality of switching angles for the gate signals $G_{M1}$-$G_{M4}$ of the transistors $M_1$-$M_4$ such that the resulting voltage $V_{ab}$ is a waveform having harmonics at two or more predetermined frequencies and of desired amplitudes.

Figure 2A:
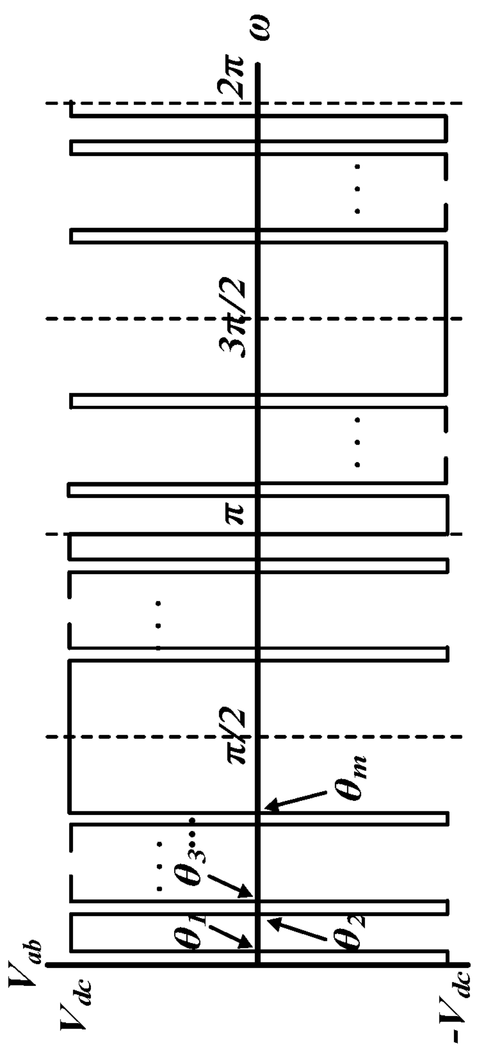
FIG. 2A illustrates an exemplary waveform generated using a bipolar multi-frequency programmed pulse width modulation (MFPWM) scheme, according to an embodiment of the present disclosure.
Figure 2B:
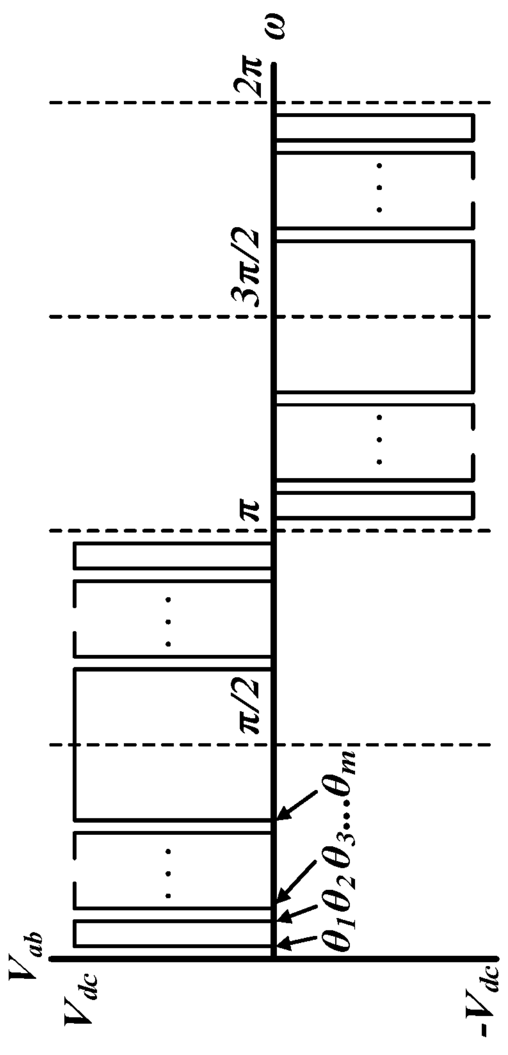
FIG. 2B illustrates an exemplary waveform generated using a unipolar MFPWM scheme, according to an embodiment of the present disclosure.

According to embodiments of the present disclosure, FIG. 2A illustrates an exemplary waveform generated using a bipolar MFPWM scheme, while FIG. 2B illustrates an exemplary waveform generated using a unipolar MFPWM scheme. In FIGS. 2A and 2B, m switching angles $\theta_1$, $\theta_2$, $\theta_3$, . . . $\theta_m$ of the quarter-symmetric waveforms are shown, and ω represents the angular frequency. Using off-line algorithms, for example, a set of the switching angles $\theta_1$, $\theta_2$, $\theta_3$, . . . $\theta_m$ may be determined for every plausible operating point of the transmitter 100 and stored in lookup tables in the memory of the controller 140, for example. Alternatively, for relatively few number of switching angles, the controller 140 may calculate the switching angles on the fly.

The Fourier expansion of the quarter symmetric bipolar MFPWM waveform of the voltage $V_{ab}$, illustrated in FIG. 2A, may be expressed as:

$$V_{ab}(\omega t) = \sum_{n=1,3,5,\ldots}^{\infty} \frac{4V_{dc}}{n\pi}[1 - 2\sin(n\theta_1) + 2\cos(n\theta_2) - 2\sin(n\theta_3) + \ldots + 2\cos(n\theta_m)] \cdot \sin(n\omega t) \quad (1)$$

where t is time. From equation (1), a set of objective functions, each relating to the amplitude of an odd harmonic of the voltage $V_{ab}$, may be derived as in equation (2).

$$\begin{cases} \frac{4V_{dc}}{\pi}[1 - 2\sin(\theta_1) + 2\cos(\theta_2) \ \ldots + 2\cos(\theta_m)] = V_{ac1} \\ \frac{4V_{dc}}{3\pi}[1 - 2\sin(3\theta_1) + 2\cos(3\theta_2) \ \ldots + 2\cos(3\theta_m)] = V_{ac3} \\ \frac{4V_{dc}}{5\pi}[1 - 2\sin(5\theta_1) + 2\cos(5\theta_2) \ \ldots + 2\cos(5\theta_m)] = V_{ac5} \\ \vdots \\ \frac{4V_{dc}}{n\pi}[1 - 2\sin(n\theta_1) + 2\cos(n\theta_2) \ \ldots + 2\cos(n\theta_m)] = V_{acn} \end{cases} \quad (2)$$

According to an embodiment of the present disclosure, the transmitter 100 may be configured to simultaneously operate in the ISM frequency band (6.78 MHz±15 kHz) and the low frequency band (100 kHz-300 kHz) of the AirFuel Alliance standard. In such a wideband dual-frequency mode WPT operation, the fundamental frequency of the voltage $V_{ab}$ may be chosen to be 101.2 kHz such that its $67^{th}$ harmonic is at 6.78 MHz. The amplitude $V_{ac1}$ of the fundamental harmonic and the amplitude $V_{ac67}$ of the $67^{th}$ harmonic may be set as desired (e.g., based on one or more of the voltages $V_{dc}$ and $V_{ab}$ and the currents $i_{T1}$ and $i_{T2}$ of the transmitter 100), and all the other harmonics may be suppressed by setting their corresponding amplitudes to zero. Thus, equation (2) results into:

$$\begin{cases} \frac{4V_{dc}}{\pi}[1-2\sin(\theta_1)+2\cos(\theta_2)\ \ldots+2\cos(\theta_m)]=V_{ac1} \\ \frac{4V_{dc}}{3\pi}[1-2\sin(3\theta_1)+2\cos(3\theta_2)\ \ldots+2\cos(3\theta_m)]=0 \\ \vdots \\ \frac{4V_{dc}}{67\pi}[1-2\sin(67\theta_1)+2\cos(67\theta_2)\ \ldots+2\cos(67\theta_m)]=V_{ac67} \\ \vdots \\ \frac{4V_{dc}}{n\pi}[1-2\sin(n\theta_1)+2\cos(n\theta_2)\ \ldots+2\cos(n\theta_m)]=0 \end{cases} \quad (3)$$

Equation (3) represents a set of transcendental equations that may be solved to obtain the switching angles $\theta_1$, $\theta_2$, $\theta_3$, . . . $\theta_m$. Because only odd-order harmonics are present, at least 33 objective equations in equation (3) must be solved to obtain the desired spectrum for the voltage $V_{ab}$. If odd harmonics above 6.78 MHz need to be suppressed, more equations and more switching angles may be added. Generally, to control harmonics in the spectrum of the voltage $V_{ab}$ from a low frequency carrier to its $n^{th}$ (odd) harmonic, at least (n+1)/2 objective functions are needed.

To solve the set of transcendental equations, a modified Newton-Raphson iteration algorithm may be employed. However, the complexity of the equations increases with the number of switching angles to be solved, and initial values for the switching angles influence convergence of the algorithm. Given that the derivation of at least 33 initial values is not straightforward, an iterative initial value derivation method may be adopted. In such a method, initial values for a smaller number of transcendental equations may be acquired first. Then, patterns of initial values from the reduced-order solutions may be examined to gain qualitative insight into initial values for the full set of equations. An example of 35 initial values for a bipolar MFPWM case is given in Table I.

TABLE I

| | | | | | | | | | | | | |
|---|---|---|---|---|---|---|---|---|---|---|---|---|
| Initial | 2.5 | 5.1 | 7.5 | 10.2 | 12.5 | 15.3 | 17.5 | 20.4 | 22.5 | 25.5 | 27.5 | 30.6 |
| values for | 32.5 | 35.7 | 37.5 | 40.8 | 42.5 | 45.9 | 47.5 | 51.0 | 52.6 | 56.2 | 57.6 | 61.3 |
| $\theta_1$ to $\theta_{35}$ | 62.7 | 66.4 | 67.8 | 71.5 | 72.8 | 76.6 | 77.9 | 81.7 | 83.0 | 86.8 | 88.1 | |
| (unit: degree) | | | | | | | | | | | | |

With the initial values determined as in Table I, the transcendental equations may be iteratively solved to obtain the switching angles $\theta_1$ to $\theta_{35}$ for desired amplitudes $V_{ac1}$ and $V_{ac67}$. Using the switching angles $\theta_1$ to $\theta_{35}$, the controller 140 may generate gate signals $G_{M1}$-$G_{M4}$ to control the transistors $M_1$-$M_4$ of the transmitter 100 and generate the desired bipolar MFPWM voltage $V_{ab}$.

Figure 3B:
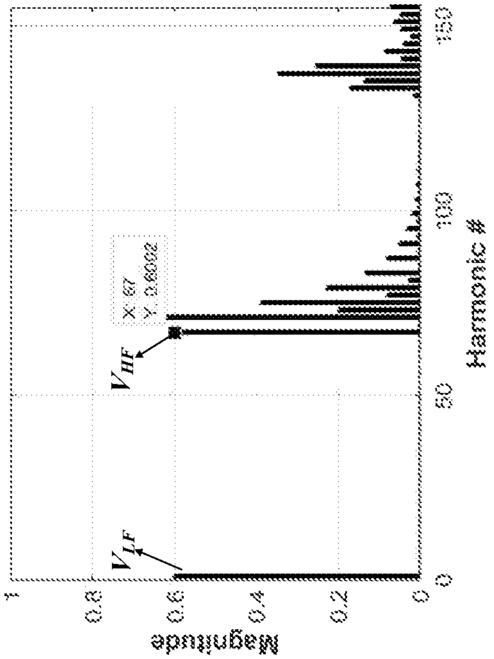
FIG. 3B shows the harmonic spectrum of the wideband bipolar MFPWM waveform in FIG. 3A.
Figure 3A:
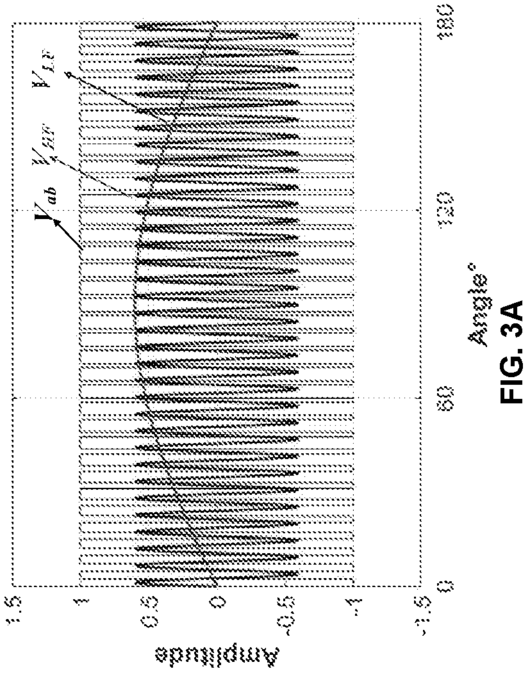
FIG. 3A illustrates an exemplary wideband bipolar MFPWM waveform and its modulated low-frequency (LF) and high-frequency (HF) contents, according to an embodiment of the present disclosure.
Figure 3C:
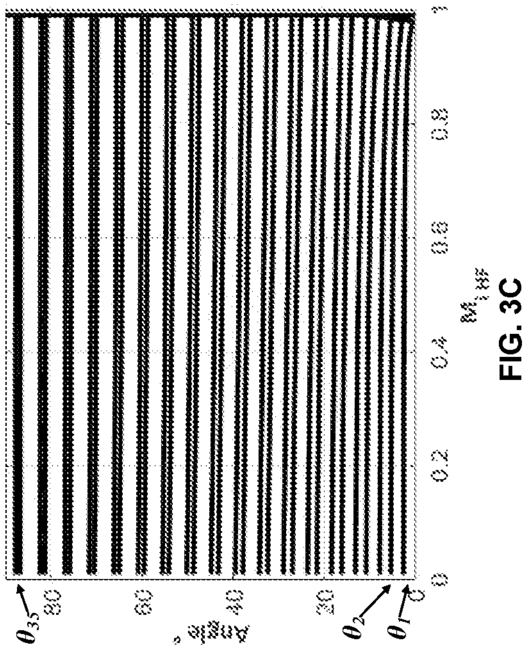
FIG. 3C shows an exemplary distribution of switching angles for a varying HF modulation index and a fixed LF modulation index of a wideband bipolar MFPWM scheme, according to an embodiment of the present disclosure.

FIG. 3A illustrates an exemplary bipolar MFPWM voltage $V_{ab}$ that may be generated, along with its modulated low-frequency (LF) content $V_{LF}$ (i.e., the fundamental harmonic) and high-frequency (HF) content $V_{HF}$ (i.e., the $67^{th}$ harmonic). Here, a LF modulation index $M_{iLF}$ $V_{ac1}/V_{dc}$) and a HF modulation index $M_{iHF}$ $V_{ac67}/V_{dc}$) are both set to 0.6. Herein, to simplify analyses and observations, $V_{dc}$ is assumed to be unity such that the amplitudes of the voltages $V_{LF}$ and $V_{HF}$ are equal to their corresponding modulation indices. FIG. 3B shows the harmonic spectrum of the bipolar MFPWM voltage $V_{ab}$ in FIG. 3A, confirming the amplitudes of the LF and HF contents at 0.6. FIG. 3C shows an exemplary distribution of solutions for switching angles $\theta_1$ to $\theta_{35}$ while varying the HF modulation index $M_{iHF}$ and keeping the LF modulation index $M_{iLF}$ fixed at 0.6. It is to be appreciated that, although difficult to illustrate and not shown here, FIG. 3C may be augmented with a third axis for varying the LF modulation index $M_{iLF}$. In other words, each permutation of $M_{iLF}$ and $M_{iHF}$ results into a different set of switching angles $\theta_1$ to $\theta_{35}$. Accordingly, for each permutation of $M_{iLF}$ and $M_{iHF}$, the resulting switching angles $\theta_1$ to $\theta_{35}$ may be stored in lookup tables in the memory of the controller 140 of the transmitter 100, for example.

Similarly to equation (3), for the quarter symmetric unipolar MFPWM waveform of the voltage $V_{ab}$, illustrated in FIG. 2B and using a corresponding Fourier expansion, a set of transcendental equations may be derived as:

$$\begin{cases} \frac{4V_{dc}}{\pi}[\cos(\theta_1)-\cos(\theta_2)\ \ldots+\cos(\theta_m)]=V_{ac1} \\ \frac{4V_{dc}}{3\pi}[\cos(3\theta_1)-\cos(3\theta_2)\ \ldots+\cos(3\theta_m)]=0 \\ \vdots \\ \frac{4V_{dc}}{67\pi}[\cos(67\theta_1)-\cos(67\theta_2)\ \ldots+\cos(67\theta_m)]=V_{ac67} \\ \vdots \\ \frac{4V_{ac}}{n\pi}[\cos(n\theta_1)-\cos(n\theta_2)\ \ldots+\cos(n\theta_m)]=0 \end{cases} \quad (4)$$

Figure 4B:
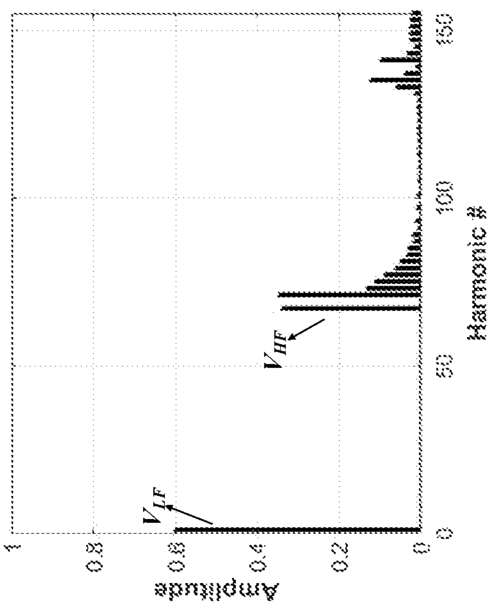
FIG. 4B shows the harmonic spectrum of the wideband unipolar MFPWM waveform in FIG. 4A.
Figure 4A:
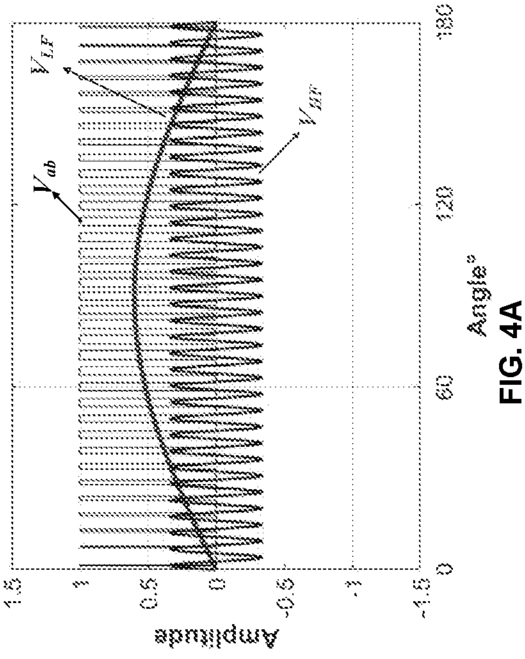
FIG. 4A illustrates an exemplary wideband unipolar MFPWM waveform and its modulated LF and HF contents, according to an embodiment of the present disclosure.
Figure 4C:
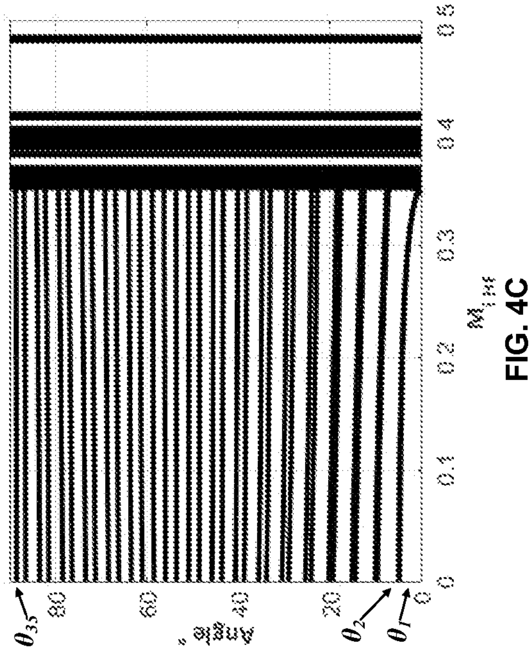
FIG. 4C shows an exemplary distribution of switching angles for a varying HF modulation index and a fixed LF modulation index of a wideband unipolar MFPWM scheme, according to an embodiment of the present disclosure.

An example of 35 initial values for a unipolar MFPWM case is given in Table II. FIG. 4A illustrates an exemplary unipolar MFPWM voltage $V_{ab}$ that may be generated, along with its modulated LF content $V_{LF}$ and HF content $V_{HF}$, when the LF modulation index $M_{iLF}$ is set to 0.6 and the HF modulation index $M_{iHF}$ is set to 0.34. FIG. 4B shows the harmonic spectrum of the unipolar MFPWM voltage $V_{ab}$ in FIG. 4A, confirming the amplitudes of the LF and HF contents at 0.6 and 0.34, respectively. FIG. 4C shows an exemplary distribution of solutions for switching angles $\theta_1$ to $\theta_{35}$ while varying the HF modulation index $M_{iHF}$ and keeping the LF modulation index $M_{iLF}$ fixed at 0.6.

TABLE II

| | | | | | | | | | | | | |
|---|---|---|---|---|---|---|---|---|---|---|---|---|
| Initial | 4.8 | 5.1 | 9.6 | 10.1 | 14.5 | 15.2 | 19.3 | 20.3 | 24.1 | 25.4 | 29.0 | 30.5 |
| values for | 33.9 | 35.6 | 38.8 | 40.7 | 43.7 | 45.8 | 48.6 | 50.9 | 53.5 | 56.0 | 58.5 | 61.1 |
| $\theta_1$ to $\theta_{35}$ | 63.4 | 66.2 | 68.4 | 71.3 | 73.4 | 76.3 | 78.4 | 81.4 | 83.5 | 86.5 | 88.5 | |
| (unit: degree) | | | | | | | | | | | | |

There are tradeoffs between the bipolar and unipolar MFPWM schemes—each has different modulation ranges, total harmonic distortion (THD), and switching losses. Thus, the selection between the bipolar and unipolar MFPWM schemes is restricted by their compatibility with WPT standards, output power range, and system efficiency. In general, bipolar MFPWM can achieve wider modulation range than unipolar MFPWM, enabling a wider range of output regulation for each power transmission channel. For example, as can be seen in FIGS. 3C and 4C, there is no solution to the objective functions of the unipolar MFPWM case above $M_{iLF}$=0.34, while the bipolar MFPWM case has an extended solution range. However, as shown in FIGS. 3B and 4B, the content of unregulated harmonics above 6.78 MHz in the unipolar MFPWM spectrum is lower than that in the bipolar MFPWM case. This feature may simplify filter design to meet electromagnetic compatibility standards and to reduce cross regulation issues.

Figure 5:
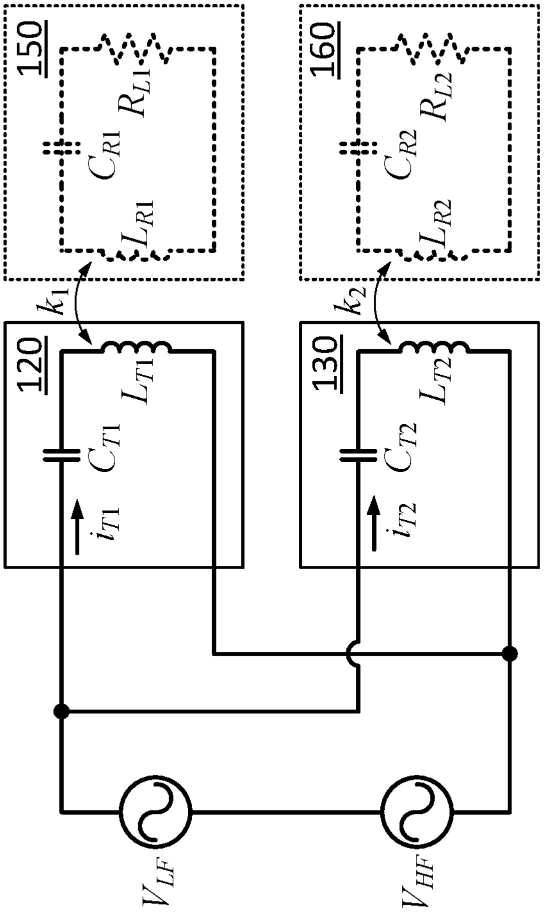
FIG. 5 is a simplified circuit model of the transmitter in FIG. 1 in wideband dual-frequency mode, according to an embodiment of the present disclosure.

FIG. 5 is a simplified circuit model of the transmitter 100 in the wideband dual-frequency mode, according to an embodiment of the present disclosure. The LF content $V_{LF}$ and the HF content $V_{HF}$ are shown as series voltage sources coupled across the first and second transmission ports 120, 130. One assumption of this simplification is that all unregulated harmonics above 6.78 MHz are at frequencies large enough to be attenuated by the resonant tanks formed by the transmission ports 120, 130 and the devices 150, 160, or the amplitudes of the unregulated harmonics are low enough that they do not cause significant impact on the output power. If significant high frequency harmonics exist and are not attenuated, the output power will be adversely influenced, causing a reduction in accuracy of individual power regulation. On the other hand, the HF harmonics may be eliminated by increasing the number of switching angles (and thereby the controllable harmonic range) in order to separate the 6.78 MHz frequency and unregulated high-order harmonics widely enough to achieve effective attenuation of the undesired harmonics. The penalty of this approach is increased switching frequency and switching losses, which may require soft switching techniques to compensate for the switching losses.

Alternatively, the amplitudes $V_{ac1}$ and $V_{ac67}$ may be set to certain operating points, where the amplitudes of nearby unregulated harmonics are suppressed inherently, such as the unipolar MFPWM with low content of high-order harmonics can be adopted instead of bipolar MFPWM. In such a case, only one leg of the inverter 110 will operate at an equivalent 6.78 MHz while the other leg will switch complementarily at 101.2 kHz using unipolar MFPWM.

Figure 6:
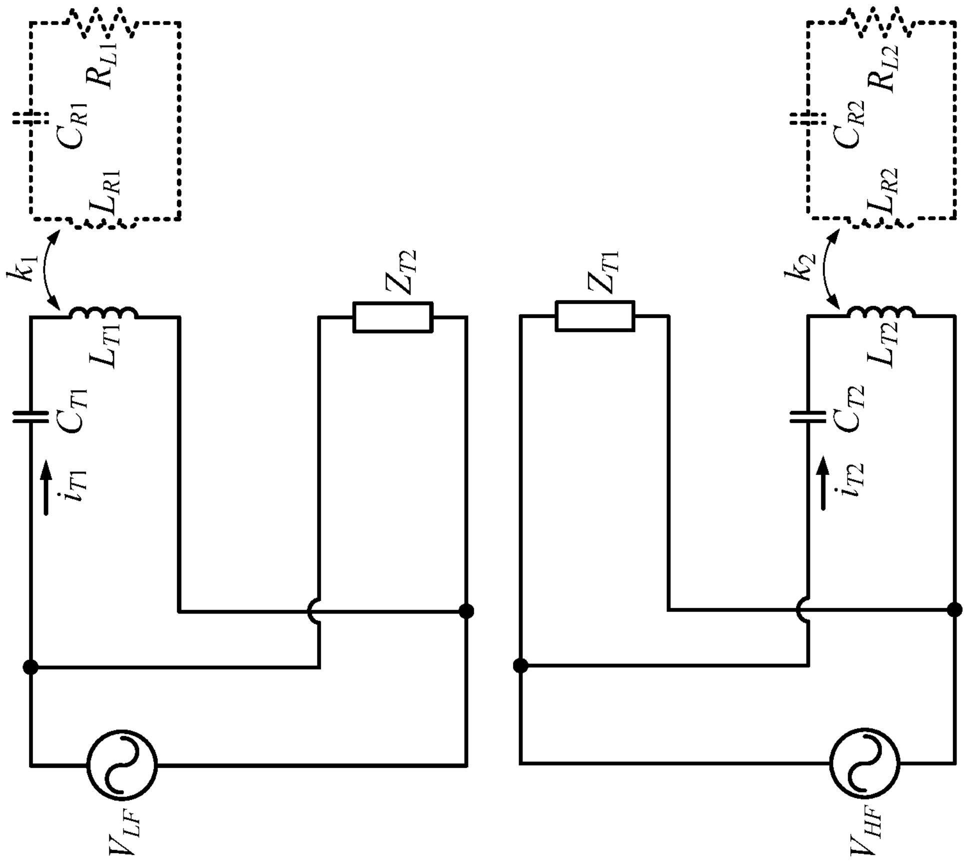
FIG. 6 is a simplified circuit models of power transmission channels of the transmitter in FIG. 1, using superposition method, according to an embodiment of the present disclosure.

When two frequencies are present in the same transmitter, if the two frequencies are very close or the quality factor of the coils is low, one frequency may be picked up by a non-targeted receiving device tuned at a different frequency. The influence of each of the two frequencies on the adjacent power transmission channel may be examined using separate circuit models, as shown in FIG. 6. These models use superposition to examine the two power transfer frequencies individually, assuming nearly zero output impedance from the inverter 110. An input impedance $Z_{T2}$ of the second power transmission channel shown to the voltage source $V_{LF}$ may be expressed as:

$$Z_{T2} = j\omega_1 L_{T2} + \frac{1}{j\omega_1 C_{T2}} + R_2 + Z_{ref2} \tag{5}$$

where $R_2$ represents the parasitic resistance of the coil in the second power transmission channel and $Z_{ref2}$, which represents the reflected impedance from secondary side of the second power transmission channel, is given by:

$$Z_{ref2} = \frac{\omega_1^2 \cdot k_2 \sqrt{L_{T2} \cdot L_{R2}}}{j\omega_1 L_{R2} + \frac{1}{j\omega_1 C_{R2}} + R_{L2} + R_2} \tag{6}$$

In a case where the transmitter 100 is configured to transmit power at 101.2 kHz and 6.78 MHz respectively on the first and second power transmission channels, a coil design may specify the inductance of the 6.78 MHz inductor $L_{T2}$ as 1 μH and the capacitance of the compensation capacitor $C_{T2}$ around 550 pF. Therefore, at 101.2 kHz, $Z_{T2}$ may be approximated as a high capacitive impedance, which may suppress any circulating current due to the 101.2-kHz voltage source in the 6.78-MHz power transmission channel.

Similarly, an input impedance $Z_{T1}$ of the first power transmission channel shown to the voltage source $V_{HF}$ may be expressed as:

$$Z_{T1} = j\omega_2 L_{T1} + \frac{1}{j\omega_2 C_{T1}} + R_1 + Z_{ref1} \tag{7}$$

where $R_1$ represents the parasitic resistance of the coil in the first power transmission channel and $Z_{ref1}$, which represents the reflected impedance from secondary side of the first power transmission channel, is given by:

$$Z_{ref1} = \frac{\omega_2^2 \cdot k_1 \sqrt{L_{T1} \cdot L_{R1}}}{j\omega_2 L_{R1} + \frac{1}{j\omega_2 C_{R1}} + R_{L1} + R_1} \tag{8}$$

The inductance of the transmitting coil of the 101.2-kHz power transmission channel may be selected as 24 μH to maintain a quality factor around 100, as suggested in the Qi standard. As a result, $Z_{T1}$ may present a high inductive impedance to the 6.78-MHz voltage source such that any circulating current due to the 6.78-MHz voltage source in the 100-kHz power transmission channel is also minimal.

Figure 7:
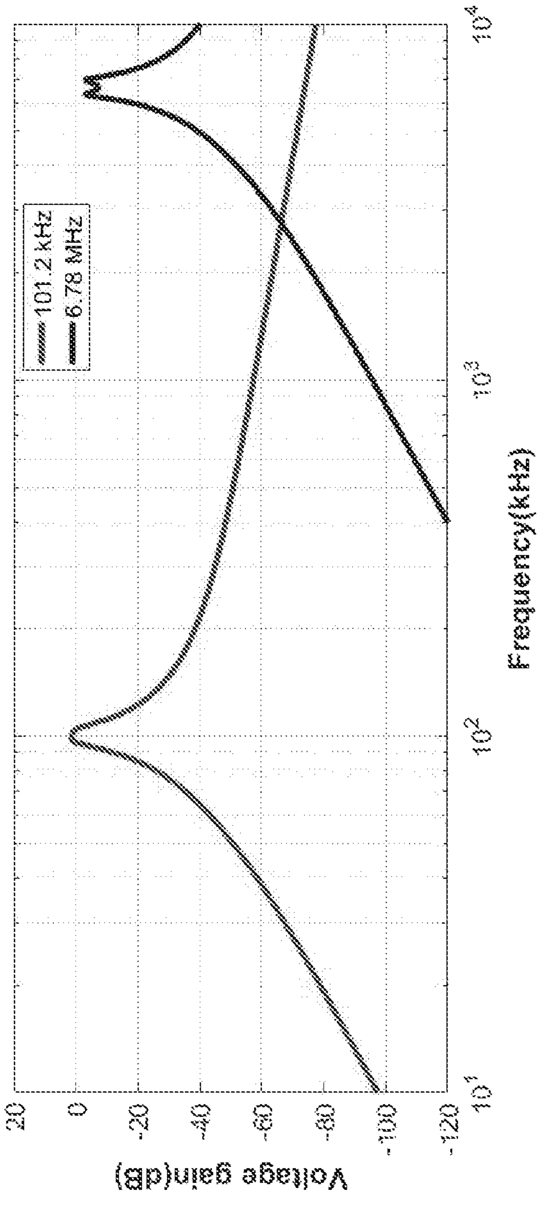
FIG. 7 are exemplary voltage gain versus frequency plots of the power transmission channels of the transmitter in FIG. 1 in wideband dual-frequency mode, according to an embodiment of the present disclosure.

FIG. 7 are voltage gain (of load to input) versus frequency plots of the 101.2-kHz and 6.78-MHz power transmission channels, according to an embodiment of the present disclosure. These plots demonstrate that each power transmission channel achieves high voltage gain at its corresponding resonant frequency, while suppressing the other. Since the selected frequencies are widely separated, by over one decade, and the quality factor of the 101.2-kHz coils and the 6.78-MHz coils are around 100 and 50, respectively, each power transmission channel presents high impedance to the other frequency. Thus, the cross-interference is attenuated.

According to an embodiment of the present disclosure, the transmitter 100 may be configured to operate in a narrowband dual-frequency mode WPT, defined as a concurrent operation in the Qi and AirFuel Alliance standards low frequency bands, which range from 87 kHz to 300 kHz. Moreover, for a single-frequency mode operation for either the Qi or the AirFuel Alliance standard within this range, multi-receiver power regulation may be also achieved using MFPWM. However, if a fundamental component and a certain odd harmonic are employed, as in the wideband dual-frequency mode, the operable frequency band may be limited. For example, the low-end frequency of the Qi standard is 87 kHz and its $3^{rd}$ harmonic is 261 kHz, which exceeds the high-end frequency of 205 kHz in Qi specification. Therefore, in order to comply with the Qi standard and obtain a wider selection of frequencies, the fundamental frequency may be selected as 29 kHz such that its $3^{rd}$ harmonic is 87 kHz and the $7^{th}$ harmonic is 205 kHz, both of which are within the allowable bands of the Qi and AirFuel Alliance standards. Based on equation (2), a set of objective functions for the narrowband bipolar MFPWM may be expressed as:

$$\begin{cases} \frac{4V_{dc}}{\pi}[1-2\sin(\theta_1)+2\cos(\theta_2)\ \ldots +2\cos(\theta_m)] = V_{ac1} = 0 \\ \frac{4V_{dc}}{3\pi}[1-2\sin(3\theta_1)+2\cos(3\theta_2)\ \ldots +2\cos(3\theta_m)] = V_{ac3} \\ \frac{4V_{dc}}{5\pi}[1-2\sin(5\theta_1)+2\cos(5\theta_2)\ \ldots +2\cos(5\theta_m)] = 0 \\ \frac{4V_{dc}}{7\pi}[1-2\sin(7\theta_1)+2\cos(7\theta_2)\ \ldots +2\cos(7\theta_m)] = V_{ac7} \\ \vdots \\ \frac{4V_{dc}}{n\pi}[1-2\sin(n\theta_1)+2\cos(n\theta_2)\ \ldots +2\cos(n\theta_m)] = 0 \end{cases} \tag{9}$$

In equation (9), the amplitude of the 29-kHz fundamental component is set to zero, as it is not used for power transfer, while the $3^{rd}$ and the $7^{th}$ harmonics are regulated to desired amplitudes. Moreover, unemployed harmonics, such the $5^{th}$ and the $9^{th}$ harmonics, may be eliminated to reduce cross-interferences between adjacent power transmission channels. Additionally, a certain range of high-order harmonics may be suppressed by increasing the number of switching angles. The tradeoffs are the same as with the MFPWM for the wideband dual-frequency mode operation described above.

Figure 8A:
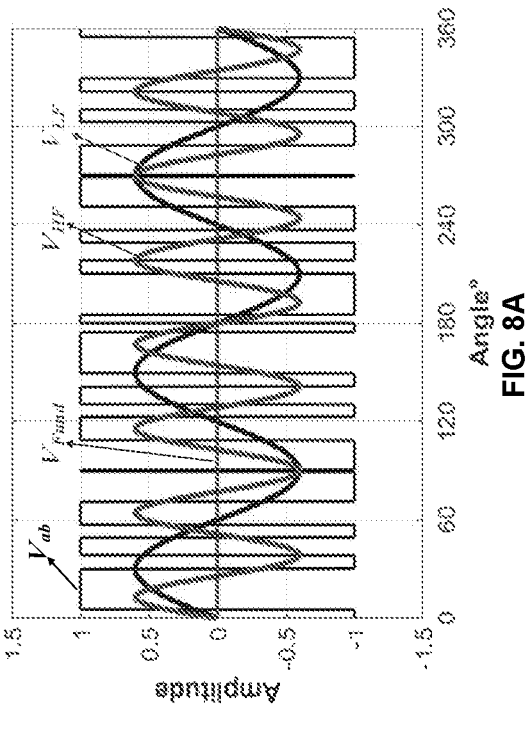
FIG. 8A illustrates an exemplary narrowband bipolar MFPWM waveform and its modulated LF and HF contents, according to an embodiment of the present disclosure.
Figure 8B:
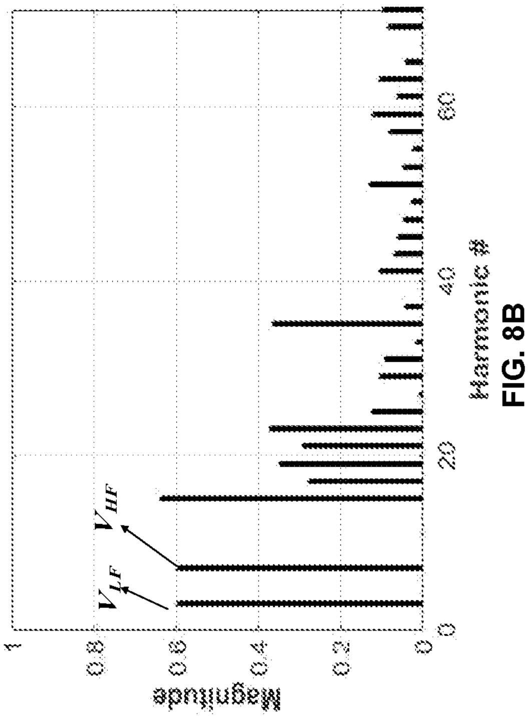
FIG. 8B shows the harmonic spectrum of the narrowband bipolar MFPWM waveform in FIG. 8A.
Figure 8C:
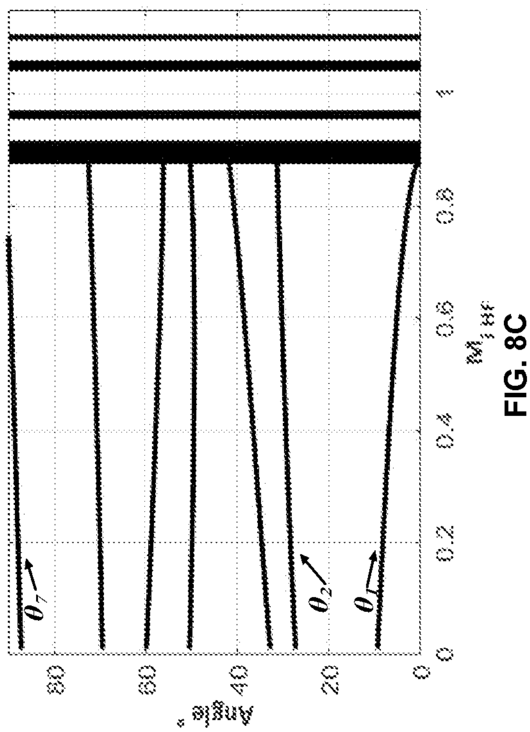
FIG. 8C shows an exemplary distribution of switching angles for a varying HF modulation index and a fixed LF modulation index of a narrowband bipolar MFPWM scheme, according to an embodiment of the present disclosure.

As previously discussed, initial value patterns may be developed for the objective functions in equation (9) and the modified Newton-Raphson numeric iteration algorithm may be used to solve the set of transcendental equations in equation (9). $V_{ac3}$ may be set to the desired amplitude for the 87-kHz component and $V_{ac205}$ to the 205-kHz component. FIG. 8A illustrates an exemplary narrowband bipolar MFPWM voltage $V_{ab}$ with seven switching angles $\theta_1$ to $\theta_7$ in a quarter-symmetric waveform, with both the LF modulation index $M_{iLF}$ and the HF modulation index $M_{iHF}$ (corresponding to the $3^{rd}$ and $7^{th}$ harmonics, respectively) set to 0.6. FIG. 8B shows the harmonic spectrum of the narrowband bipolar MFPWM voltage $V_{ab}$ in FIG. 8A, confirming the magnitudes of the LF and HF contents at 0.6. FIG. 3C shows an exemplary distribution of solutions for switching angles $\theta_1$ to $\theta_7$ while varying the HF modulation index $M_{iHF}$ and keeping the LF modulation index $M_{iLF}$ fixed at 0.6.

For a narrowband unipolar MFPWM case, a set of objective functions may be expressed as:

$$\begin{cases} \frac{4V_{dc}}{\pi}[\cos(\theta_1)-\cos(\theta_2)\ \ldots +\cos(\theta_m)] = V_{ac1} \\ \frac{4V_{dc}}{3\pi}[\cos(3\theta_1)-\cos(3\theta_2)\ \ldots +\cos(3\theta_m)] = V_{ac3} \\ \frac{4V_{dc}}{5\pi}[\cos(5\theta_1)-\cos(5\theta_2)\ \ldots +\cos(5\theta_m)] = 0 \\ \frac{4V_{dc}}{7\pi}[\cos(7\theta_1)-\cos(7\theta_2)\ \ldots +\cos(7\theta_m)] = V_{ac7} \\ \vdots \\ \frac{4V_{dc}}{n\pi}[\cos(n\theta_1)-\cos(n\theta_2)\ \ldots +\cos(n\theta_m)] = 0 \end{cases} \tag{10}$$

In equation (10), in order to obtain solutions from the numeric iteration algorithm, the amplitude $V_{ac1}$ of the fundamental component cannot be zero. This is due to the inherent characteristics of a unipolar waveform, where the fundamental contour (e.g., the 29-kHz component) naturally forms the shape of the unipolar waveform. If the fundamental component in a unipolar MFPWM waveform is set to zero, then the inverter 110 output voltage $V_{ab}$ is zero and no power may be delivered.

Figure 9B:
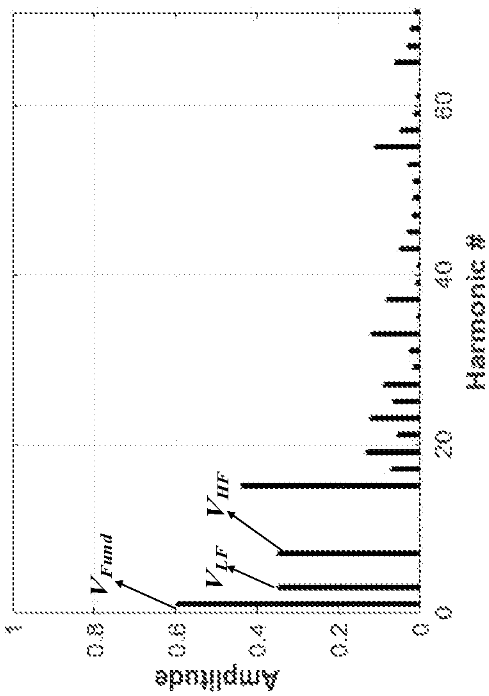
FIG. 9B shows the harmonic spectrum of the narrowband unipolar MFPWM waveform in FIG. 9A.
Figure 9A:
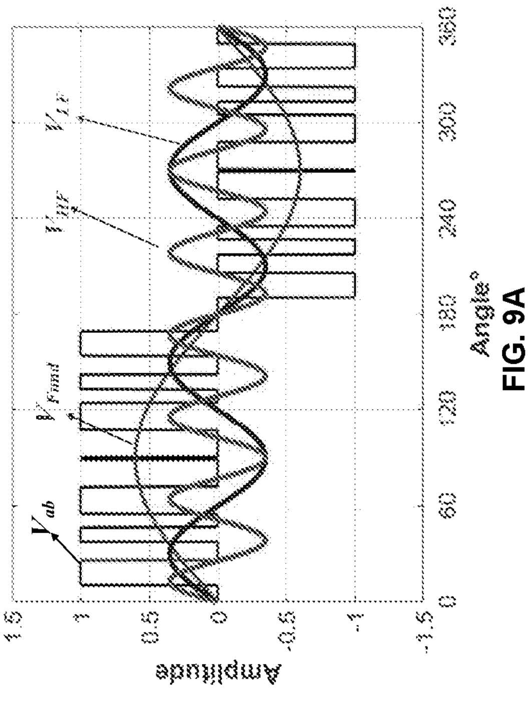
FIG. 9A illustrates an exemplary narrowband unipolar MFPWM waveform and its modulated LF and HF contents, according to an embodiment of the present disclosure.
Figure 9C:
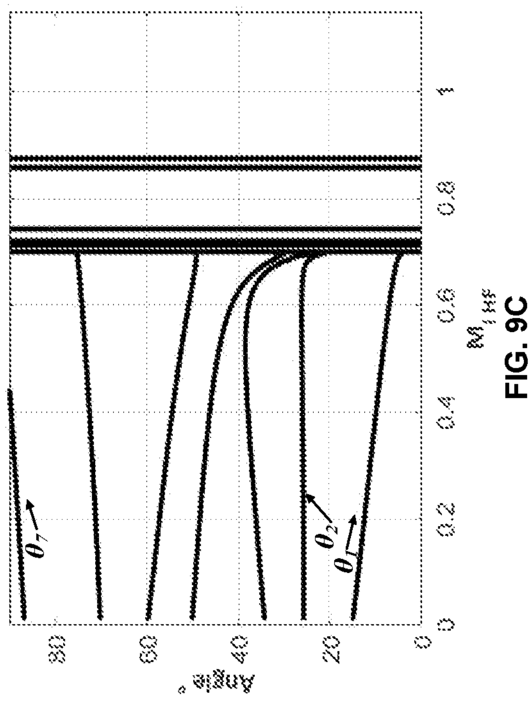
FIG. 9C shows an exemplary distribution of switching angles for a varying HF modulation index and a fixed LF modulation index of a narrowband unipolar MFPWM scheme, according to an embodiment of the present disclosure.

A nonzero amplitude $V_{ac1}$ results in the modulation range of the unipolar MFPWM being restrained, in that the modulation index for the $3^{rd}$ and $7^{th}$ harmonics cannot significantly exceed the modulation index for the fundamental component. The 3rd and $7^{th}$ harmonics, similar to the narrowband bipolar MFPWM case, may be employed for power delivery. FIG. 9A illustrates an exemplary narrowband unipolar MFPWM voltage $V_{ab}$, along with the fundamental component $V_{Fund}$, $3^{rd}$ harmonic LF component $V_{LF}$, and 7th harmonic HF component $V_{HF}$. As shown in FIG. 9B, the fundamental amplitude $V_{ac1}$ is set to 0.6, and both the amplitudes of the $3^{rd}$ and $7^{th}$ harmonics to 0.35. In this case, the fundamental amplitude $V_{ac1}$ is set to 0.6 to maximize modulation range of LF and HF components.

Therefore, in the narrowband dual-frequency mode, three different frequencies are simultaneously modulated by employing MFPWM. The fundamental component in both bipolar and unipolar MFPWM cases are not intended for power transfer due to standard constrains, and will be attenuated by the resonant networks. The fundamental frequency can be set to zero in the bipolar MFPWM case, while the unipolar MFPWM requires a fundamental component.

Figure 10:
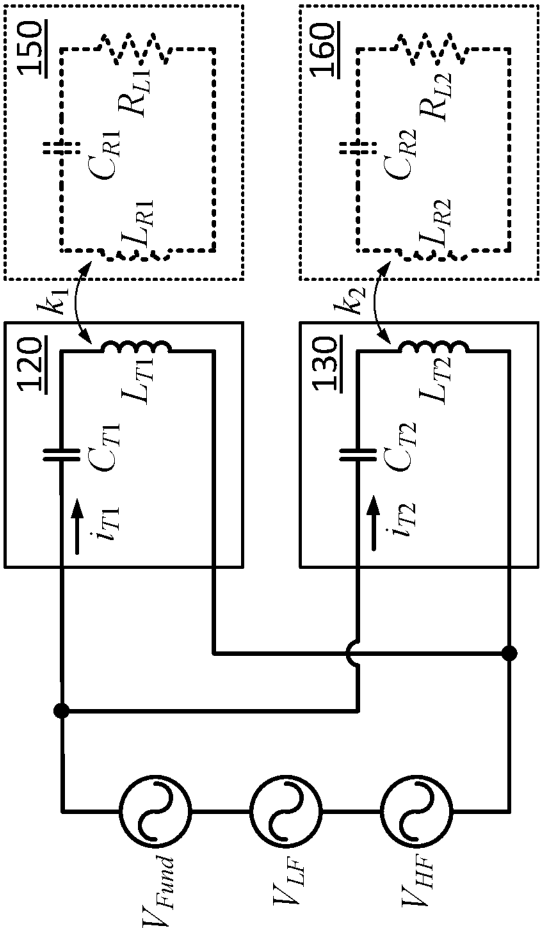
FIG. 10 is a simplified circuit model of the transmitter in FIG. 1 in narrowband dual-frequency mode, according to an embodiment of the present disclosure.

FIG. 10 is a simplified circuit model of the transmitter 100 in the narrowband dual-frequency mode, according to an embodiment of the present disclosure. Unlike the wideband dual-frequency mode operation of 101.2 kHz and 6.78 MHz, the usable frequencies in low frequency band are relatively close. As a result, a poor quality factor of transmitting coils may result in cross-regulation issues between the two frequencies. By adopting coil parameters suggested by standards such as 24 pH with 100 quality factor, the 87-kHz power transmission channel may guarantee −15 dB attenuation at 205 kHz, while the 205-kHz power transmission channel may have at least −30 dB at 87 kHz, for load resistances greater than 1Ω. Accordingly, coils for the 87-kHz power transmission channel are modeled after a commercial coil design, having an inductance of 24 pH and a quality factor of 100; the 205 kHz coils are modeled to have an inductance of 26 pH and a quality factor of 50.

Figure 11:
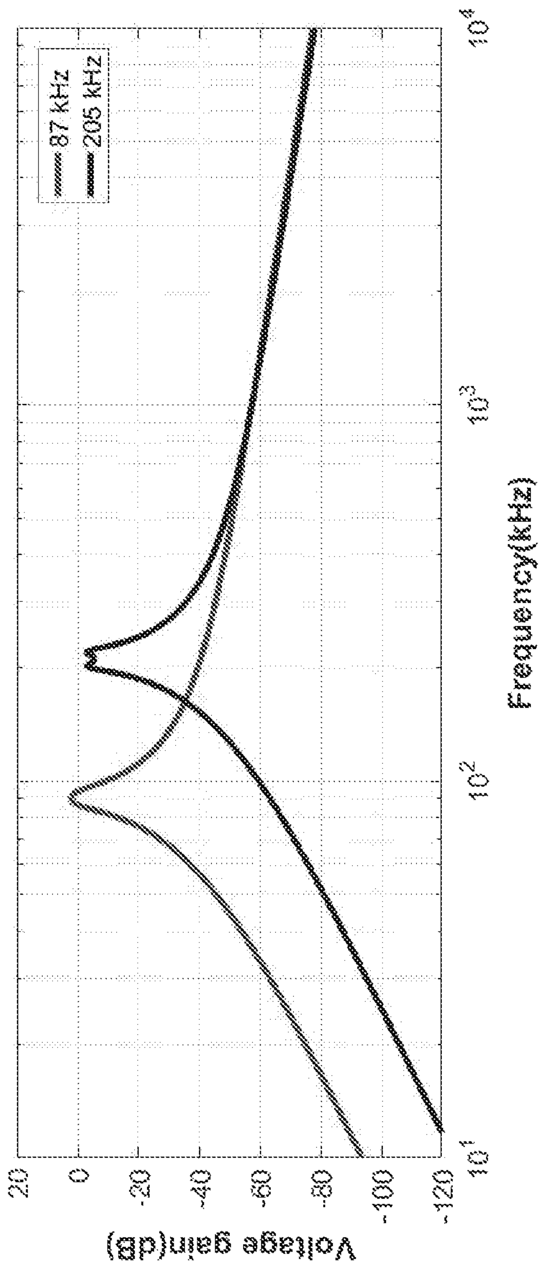
FIG. 11 are exemplary voltage gain versus frequency plots of the power transmission channels of the transmitter in FIG. 1 in narrowband dual-frequency mode, according to an embodiment of the present disclosure.

A frequency sweep of the voltage gains in the two power transmission channels is shown in FIG. 11. The two power transmission channels exhibit −65 dB and −40 dB for non-targeted frequencies to suppress any cross-regulation issues. Bipolar MFPWM with seven switching angles is able to regulate harmonics up to 435 kHz, and exhibit low voltage gain (−50 dB) for unregulated harmonics above 435 kHz. This high frequency attenuation is desirable to push unregulated harmonics higher in the spectrum, where the matching networks have larger attenuation. For unipolar MFPWM, however, both power transmission channels are required to not only suppress unregulated harmonics, but also attenuate the unavoidable fundamental component. In FIG. 11, the gain at 29 kHz in the two power transmission channels are −60 dB and −95 dB; these high impedances may suppress the undesired fundamental component.

As a result, narrowband dual-frequency mode WPT, or multi-receiver regulation in single-frequency mode may be achieved by assigning desired amplitudes to dedicated frequencies, while other frequencies in the spectrum may be attenuated by the band-pass filtering of two resonant networks. Designing at different frequencies for multiple receivers within the Qi standard and/or the low-frequency AirFuel Alliance band may be accomplished using the same principles.

Embodiments of the disclosure are specifically illustrated and/or described herein. However, it will be appreciated that modifications and variations of the disclosure are covered by the above teachings and within the purview of the appended claims without departing from the spirit and intended scope of the disclosure. Further variations that are consistent with the principles described above are permissible.

What is claimed is:

1. A transmitter for wireless power transfer, comprising:

an input port;

a first transmission port;

a second transmission port;

an inverter, wherein an input of the inverter is coupled to the input port, and an output of the inverter is coupled in parallel to the first and second transmission ports; and a controller programmed to control the inverter to modulate an output voltage at the output of the inverter such that power from the input port is transmitted at a first frequency through the first transmission port and at a second frequency through the second transmission port.

2. The transmitter of claim 1, wherein the inverter comprises a first leg in parallel with a second leg, each leg comprising two switches in series, and the controller is programmed to one of look up and calculate a number of switching angles to generate switching signals for the four switches of the inverter.

3. The transmitter of claim 2, wherein the number of switching angles is based on the first frequency and second frequency; and the switching angles are determined using a multi-frequency programmed pulse width modulation (MFPWM) scheme.

4. The transmitter of claim 3, wherein the MFPWM scheme is one of a bipolar MFPWM scheme and a unipolar MFPWM scheme.

5. The transmitter of claim 2, wherein each of the four switches is a wide bandgap field effect transistor.

6. The transmitter of claim 1, wherein the controller is programmed to control the inverter based on at least one of an input voltage across the input port, the output voltage, a current flowing in the first transmission port, and a current flowing in the second transmission port.

7. The transmitter of claim 1, wherein the controller is programmed to control the inverter to operate in a wideband dual-frequency mode, such that the first frequency is 101.2 kHz and the second frequency is 6.78 MHz.

8. The transmitter of claim 7, wherein a fundamental frequency of the output voltage is 101.2 kHz.

9. The transmitter of claim 1, wherein the controller is programmed to control the inverter to operate in a narrowband dual-frequency mode, such that the first frequency is 87 kHz and the second frequency is 205 kHz.

10. The transmitter of claim 9, wherein a fundamental frequency of the output voltage is 29 kHz.

11. A method of controlling a transmitter for wireless power transfer, comprising:

receiving power at an input port;

modulating an output voltage at an output of an inverter to transmit power received at an input of the inverter from the input port at a first frequency through a first transmission port and at a second frequency through a second transmission port, the first transmission port and the second transmission port being connected in parallel to the output of the inverter.

12. The method of claim 11, wherein the inverter comprises a first leg in parallel with a second leg, each leg including two switches in series, and the modulating comprises one of looking up and calculating, by a controller of the transmitter, a number of switching angles to generate switching signals for the four switches of the inverter.

13. The method of claim 12, Wherein the number of switching angles is based on the first frequency and second frequency, and the switching angles are determined using a multi-frequency programmed pulse width modulation (MFPWM) scheme.

14. The method of claim 13, wherein the MFPWM scheme is one of a bipolar MFPWM scheme and a unipolar MFPWM scheme.

15. The method of claim 11, wherein the modulating is based on at least one of an input voltage across the input port, the output voltage, a current flowing, in the first transmission port, and a current flowing in the second transmission port.

16. The method of claim 11, wherein the modulating, causes the inverter to operate in a wideband dual-frequency mode, such that the first frequency is 101.2 kHz and the second frequency is 6.78 MHz.

17. The method of claim 16, wherein a fundamental frequency of the output voltage is 101.2 kHz.

18. The method of claim 11, wherein the modulating causes the inverter to operate in a narrowband dual-frequency mode, such that the first frequency is 87 kHz and the second frequency is 205 kHz.

19. The method of claim 18, wherein a fundamental frequency of the output voltage is 29 kHz.

* * * * *

UNITED STATES PATENT AND TRADEMARK OFFICE

CERTIFICATE OF CORRECTION

PATENT NO. : 10,637,293 B2
APPLICATION NO. : 15/718767
DATED : April 28, 2020
INVENTOR(S) : Costinett et al.

It is certified that error appears in the above-identified patent and that said Letters Patent is hereby corrected as shown below:

In the Specification

Column 3, Line 43: Please correct "$L_{72}$" to read -- $L_{T2}$ --

Column 10, Line 40: Please correct "24 pH" to read -- 24 μH --

Column 10, Line 46: Please correct "24 pH" to read -- 24 μH --

Column 10, Line 48: Please correct "26 pH" to read -- 26 μH --

In the Claims

Column 11, Line 36, Claim 3: Please correct "frequency;" to read -- frequency, --

Column 12, Line 26, Claim 13: Please correct "Wherein" to read -- wherein --

Column 12, Line 37, Claim 15: Please correct "flowing, in" to read -- flowing in --

Column 12, Lines 40-41, Claim 16: Please correct "modulating, causes" to read -- modulating causes --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*